(12) United States Patent
BenShitrit et al.

(10) Patent No.: US 10,932,603 B2
(45) Date of Patent: Mar. 2, 2021

(54) ELECTRONIC MEZUZAH SYSTEM, DEVICE AND METHOD OF USE

(71) Applicant: SHEMA ISRAEL MEZUZAH INC, Valley Village, CA (US)

(72) Inventors: Avraham BenShitrit, Valley Village, CA (US); Alexander Winter, Sherman Oaks, CA (US)

(73) Assignee: SHEMA ISRAEL MEZUZAH INC, Valley Village, CA (US)

( * ) Notice: Subject to any disclaimer, the term of this patent is extended or adjusted under 35 U.S.C. 154(b) by 0 days.

(21) Appl. No.: 16/248,228

(22) Filed: Jan. 15, 2019

(65) Prior Publication Data

US 2019/0216248 A1 Jul. 18, 2019

Related U.S. Application Data (60) Provisional application No. 62/618,781, filed on Jan. 18, 2018.

(51) Int. Cl.

| H04B 1/20 | (2006.01) |
| A47G 33/00 | (2006.01) |
| G06F 3/16 | (2006.01) |
| G06F 3/0488 | (2013.01) |
| G06F 3/041 | (2006.01) |
| G06F 3/0482 | (2013.01) |

(52) U.S. Cl.
CPC ........... *A47G 33/00* (2013.01); *G06F 3/0412* (2013.01); *G06F 3/0482* (2013.01); *G06F 3/0488* (2013.01); *G06F 3/162* (2013.01); *G06F 3/165* (2013.01)

(58) Field of Classification Search
CPC ..... A47G 33/00; G06F 3/0412; G06F 3/0482; G06F 3/0488; G06F 3/162; G06F 3/165
See application file for complete search history.

(56) References Cited

U.S. PATENT DOCUMENTS 5,808,278 A * 9/1998 Moon ............... A47G 33/00 200/43.01
6,473,661 B1 * 10/2002 Wollner ............. G05B 15/02 700/17

(Continued)

FOREIGN PATENT DOCUMENTS

FR 2689672 A1 10/1993

OTHER PUBLICATIONS

IP, Method and Apparatus to manage Battery resources based on user schedule and activity (Year: 2012).*

(Continued)

*Primary Examiner* — Quang Pham
(74) *Attorney, Agent, or Firm* — Polsinelli LLP (57) ABSTRACT

An electronic device, with a compartment for storing a religious script, activates playback of a stored audio file in response to a touch input. The electronic device includes power and timing components that can be isolated or disconnected so that the device will not operate during specified times, such as high holy days. Different audio files are available for selection on a server, and the desired audio file can be selected using an application that is running on a separate device, such as a cell phone or table. Provisions can also be made for storage and playback of video files in response to a touch input.

9 Claims, 13 Drawing Sheets

(56) References Cited

U.S. PATENT DOCUMENTS

| | | | |
|---|---|---|---|
| 6,965,801 B2* | 11/2005 | Hall | G04G 15/006 700/66 |
| 2003/0092297 A1 | 5/2003 | Reindle et al. | |
| 2005/0133353 A1* | 6/2005 | Whitman | H01H 3/20 200/333 |
| 2006/0074497 A1* | 4/2006 | Pollin | G04G 15/006 700/14 |
| 2009/0168088 A1* | 7/2009 | Rosenblatt | G06F 1/1632 358/1.12 |
| 2009/0254831 A1* | 10/2009 | Dolny | G06Q 10/109 715/733 |
| 2010/0044248 A1 | 2/2010 | Koby et al. | |
| 2011/0084829 A1* | 4/2011 | Shapira | A47G 33/00 340/517 |
| 2011/0170379 A1* | 7/2011 | Eylon-Azoulay | G04B 19/08 368/15 |
| 2011/0289306 A1 | 11/2011 | Khosravi et al. | |
| 2012/0047498 A1* | 2/2012 | Motta | G06F 8/65 717/171 |
| 2012/0158904 A1* | 6/2012 | He | H04L 67/26 709/217 |
| 2015/0350319 A1* | 12/2015 | Park | H04L 67/18 709/203 |
| 2016/0223994 A1 | 8/2016 | Honda | |
| 2019/0115628 A1* | 4/2019 | Ho | H02J 7/0025 |

OTHER PUBLICATIONS

Invitation to Pay Additional Fees and, Where Applicable, Protest fee, from the International Searching Authority, dated Mar. 6, 2019, 2 pages, for corresponding International Patent Application No. PCT/US2019/013882.

International Search Report and Written Opinion from the International Searching Authority, dated May 8, 2019, 10 pages, for corresponding International Patent Application No. PCT/US2019/013882.

* cited by examiner

ELECTRONIC MEZUAH SYSTEM, DEVICE AND METHOD OF USE

CROSS-REFERENCE TO RELATED APPLICATIONS

This application claims priority to U.S. Provisional Patent Application Ser. No. 62/618,781, entitled "Electronic Mezuzah Device and Method of Use" which was filed on Jan. 18, 2018, the full disclosure of which is incorporated herein by reference for all purposes.

BACKGROUND

For those who practice the Jewish faith or tradition, the mezuzah enjoys widespread use. A mezuzah includes a small scroll inscribed with Biblical verse (Deuteronomy 6:4-9 and 11:13-21). The scroll is placed in a case, and the case is attached to a doorpost of a home. This includes the entry door, and any or all doors within the home. Other religions or faiths, may have different practices and customs for blessings. What is needed is a mezuzah that provides more than simply a case for the scroll, also allowing the presentation of audio and video blessings and greetings. This can provide greetings by family, Rabies, Pastors and other religious personalities.

The preceding description is not to be construed as an admission that any of the description is prior art relative to the present invention.

SUMMARY OF THE INVENTION

A small electronic device includes a processor and memory to store program code and electronic representations of recorded audio blessings and greetings. The processor causes a speaker on the device to play the recorded audio blessing in response to a touch input. The electronic device is secured to the doorpost of a home, and includes a compartment to store a small scroll. The scroll has an inscribed Biblical verse. The electronic device has electrical power and timing components that are configured to remove or isolate electrical power from the electric device so that is does not operate during specific dates and times, such as Sabbat, high holy days and times of other important religious observations. The electronic device includes a wireless communication component that allows a user to select and manage the recorded audio blessings that are played in response to the touch input. The electronic device may also include a video touch display to display recorded images or video in response to the touch input.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

For those practicing the Jewish faith, a mezuzah is traditionally affixed on the doorpost of a home as a part of the faith. The traditional mezuzah includes a hand-written scroll of Biblical verse that is prepared on parchment with specific types of quill and ink. The parchment is rolled in a particular way and placed in a case so it can be oriented in a particular way and affixed on the doorpost. A mezuzah is usually affixed to every important doorway in a home or office, and it is permanently affixed to the doorpost in a ceremony. As a person passes through the doorway, they can touch the mezuzah with their hand, and in this way receive and acknowledge the blessing that is inscribed on the scroll.

The instant invention expands on a traditional mezuzah by including components that store and play a recorded audio greeting in response to a touch on the device as a person passes through the doorway.

Figure 1:
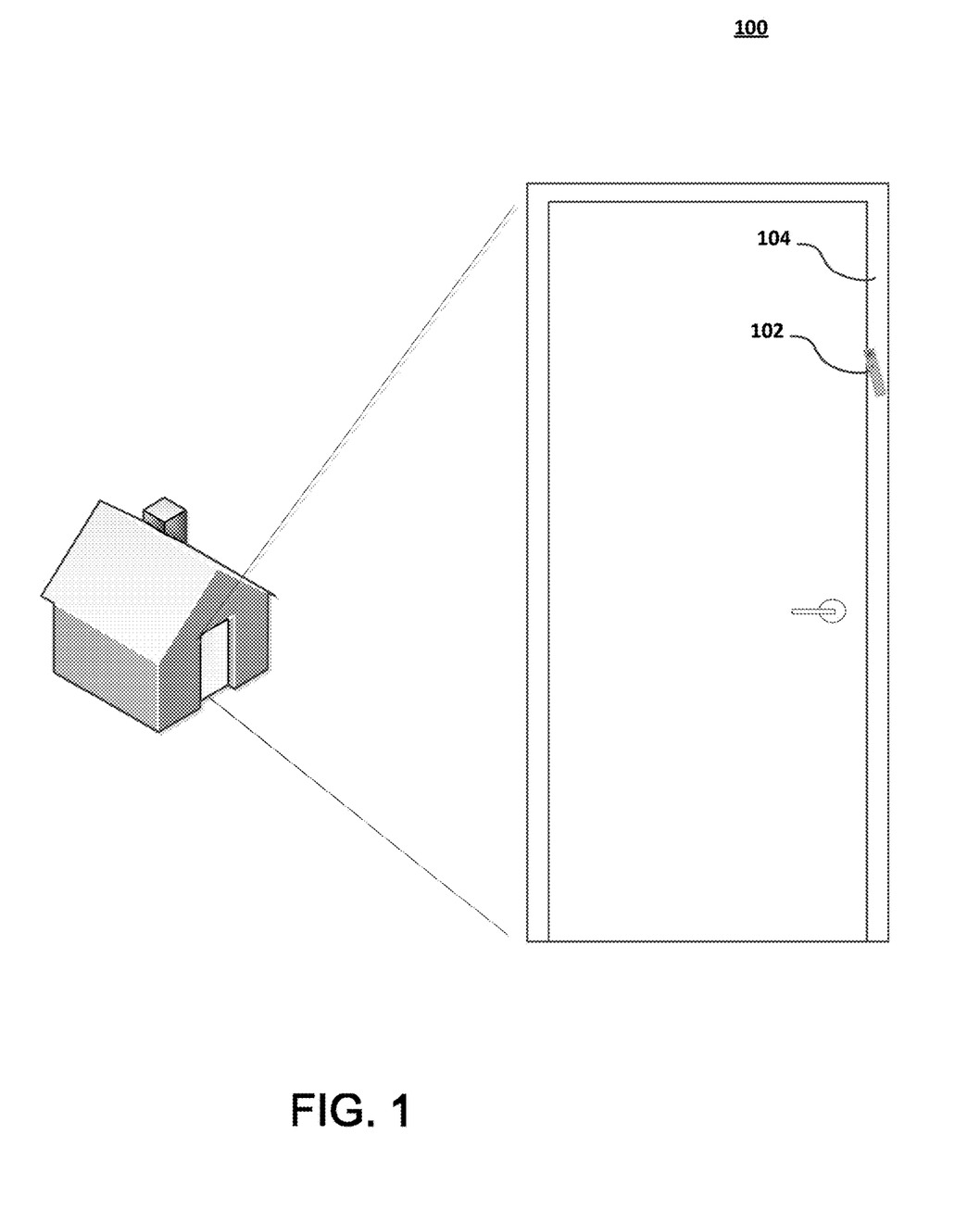
FIG. 1 illustrates an example of a system according to one embodiment.
Figure 2:
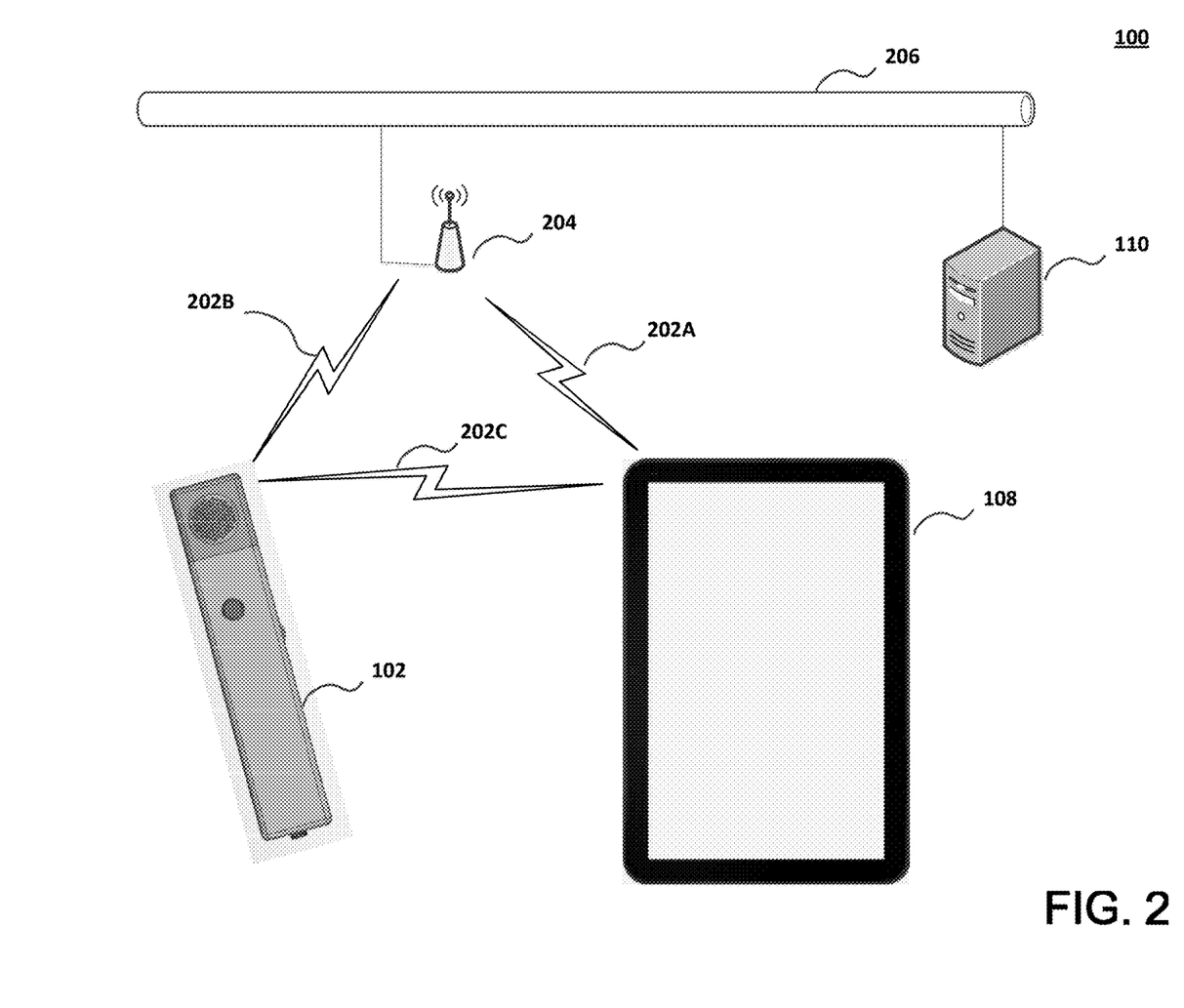
FIG. 2 illustrates an example of a system according to one embodiment.
Figure 3:
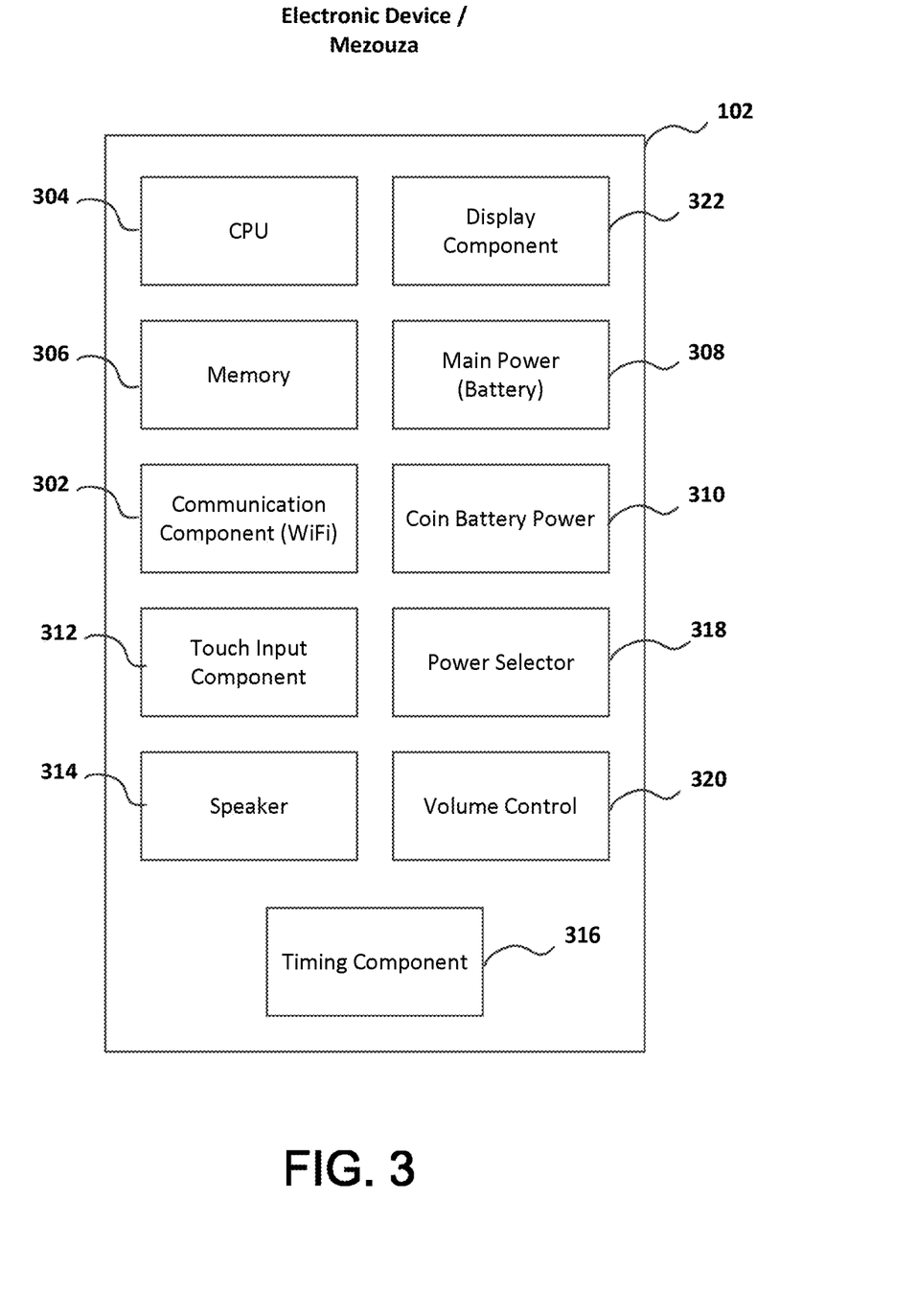
FIG. 3 illustrates an example of an electronic device according to one embodiment.
Figure 4:
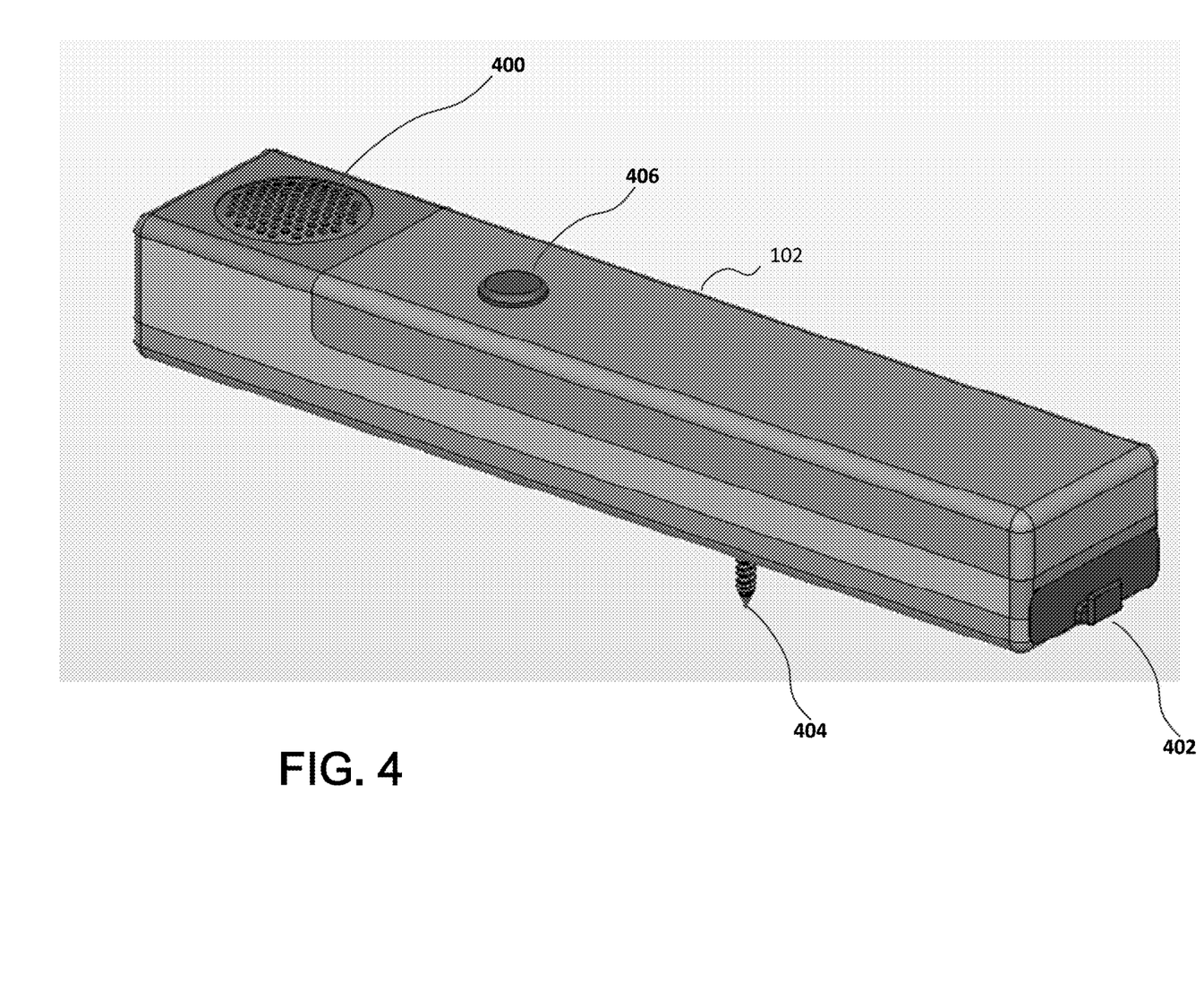
FIG. 4 illustrates an example of an electronic device according to one embodiment.
Figure 5:
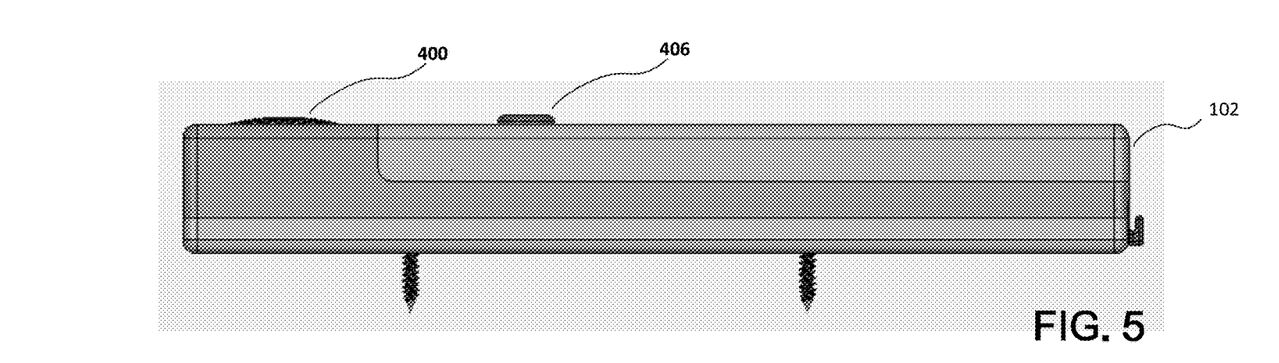
FIG. 5 illustrates an example of an electronic device according to one embodiment.
Figure 6:
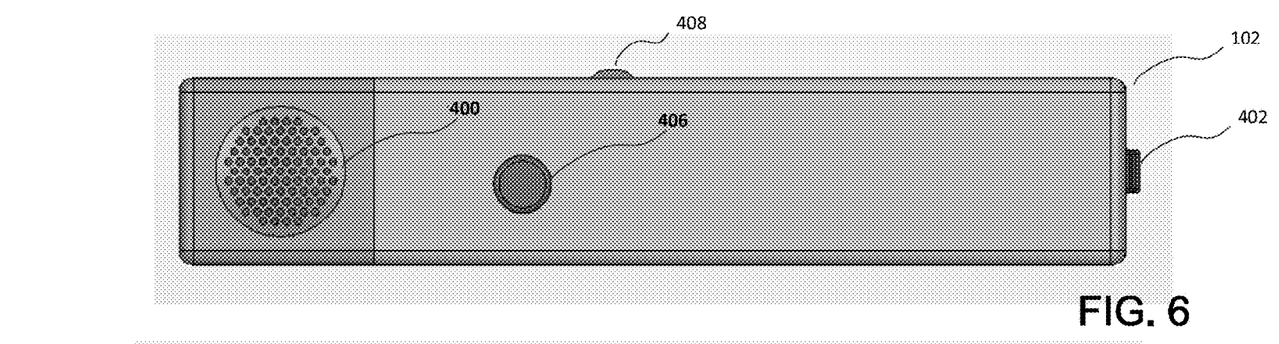
FIG. 6 illustrates an example of an electronic device according to one embodiment.
Figure 7:
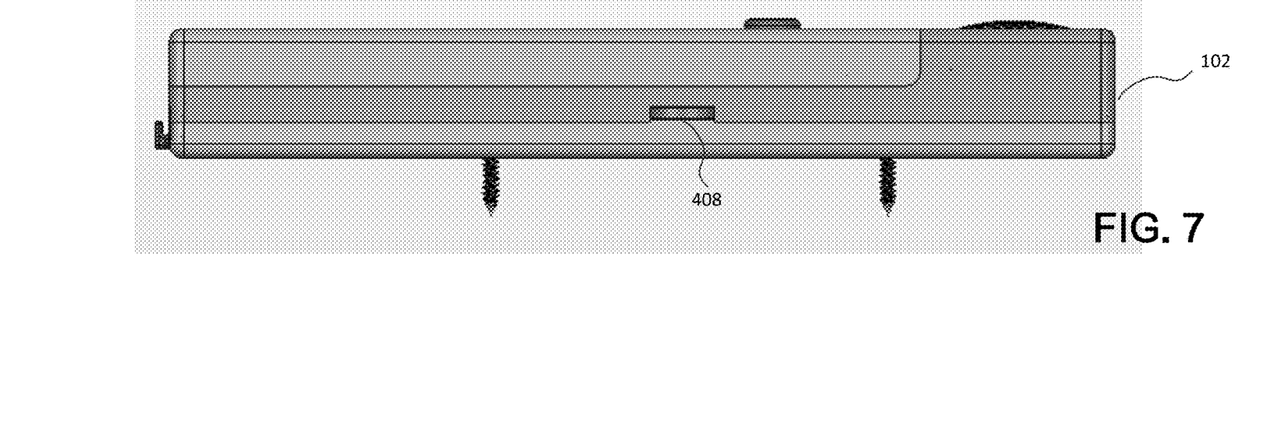
FIG. 7 illustrates an example of an electronic device according to one embodiment.
Figure 8:
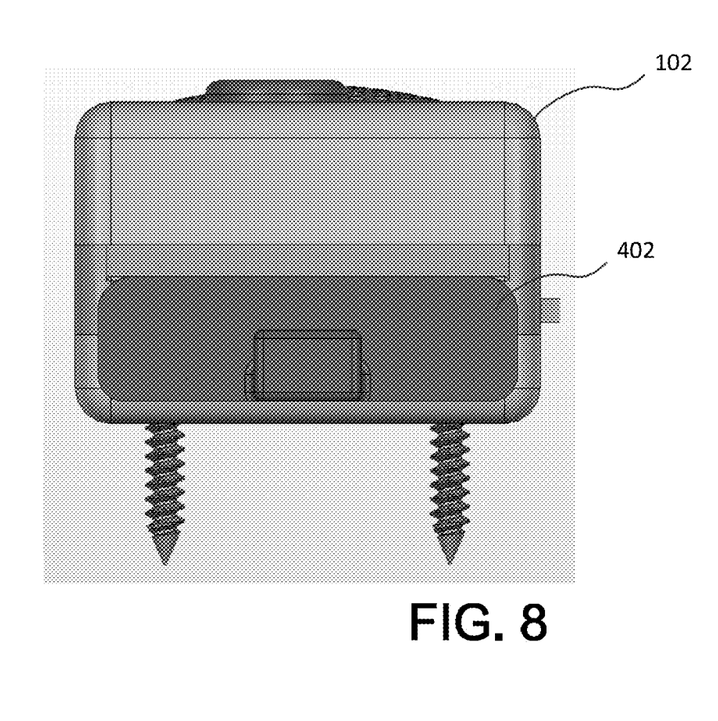
FIG. 8 illustrates an example of an electronic device according to one embodiment.
Figure 9:
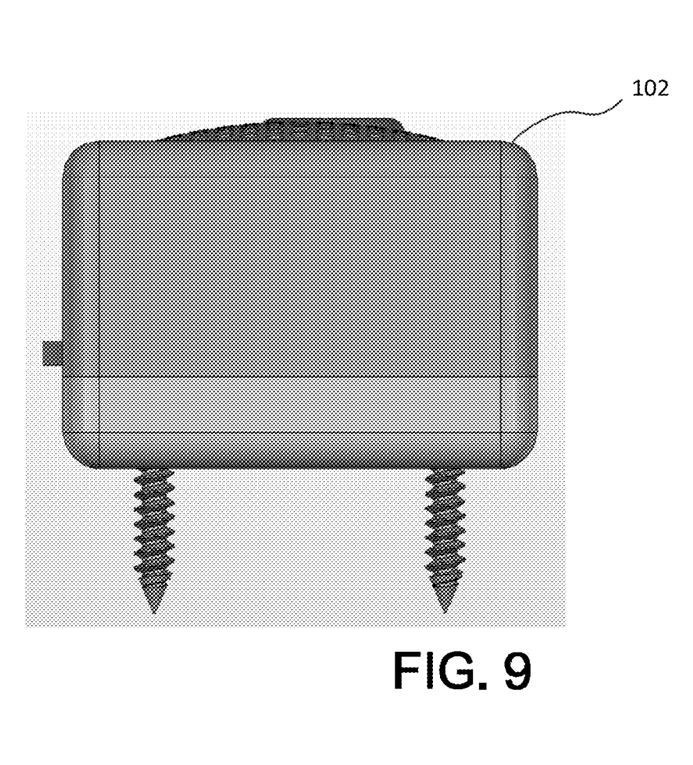
FIG. 9 illustrates an example of an electronic device according to one embodiment.

As illustrated in FIGS. 1, 2 and 3, components of system 100 include a mezuzah in the form of an electronic device 102 that is configured so that it can be mounted to a jam 104, such as the door jam on the entry door of a home. Electronic device 102 includes at least one wireless communication component 302. In one embodiment, the wireless communication component 302 is a WiFi component (IEEE 802.11). In another alternative embodiment, the wireless communication component is Bluetooth (IEEE 802.15.1). The wireless communication component allows wireless connections (202B, 202C) between electronic device 102 and other electronic devices 108 or servers 110. The wireless connection between electronic device 102 and the other electronic devices 108, 110 can be direct connections, such as an ad hoc WiFi connection, or the wireless connection between electronic device 102 and the other electronic devices 108 or servers 110 can be over a network 206, using a wireless access point 204.

In addition to the wireless communication component 302, electronic device 102 includes at least one central processing unit (CPU) 304, some memory 306, and at least two sources of power 308, 310. In one implementation CPU 304 is an ARM processor, although other types of CPU are envisioned. Some of the memory is typically Random Access Memory (RAM), and other parts are typically Read Only Memory (ROM). Some of the memory may be an integral part of the CPU architecture, and other memory may be provided through memory that is remote but accessible to the CPU, such as flash memory. The main battery power 308 is typically a battery pack, such as one or more AA or AAA batteries. The batteries can be rechargeable such as Lithium, and may allow recharging using a USB connection. The main battery power 308 provides power to most of the components of electronic device 102, such as the CPU 304, memory 306, wireless communication component 302, input component 312, and speaker 314. It is also possible that instead of a battery pack, the main power 308 is provided by wired mains power (e.g., 110/220 VAC) or from a lower voltage wired AC/DC power source (e.g., 16/24 VAC/VDC), such as might be available at a doorbell. The coin battery power 310 provides power to a timing component 316, and the timing component controls power selector 318. Power selector 318 connects or disconnects the main power battery 308 to components of electronic device 102. Electronic device 102 also includes volume control 320, which can be used to adjust the volume of audio that is presented or played using speaker 314.

Electronic device 102 connects to server 110 over network 206. In one implementation, this is through wireless access point 204 and network 206. Network 206 includes local area networks (LAN), such as in a home or office, routers, switches and modems that connect the LAN to the internet. Although not illustrated, server 110 also includes a CPU, memory and storage for code, input/output devices, and network access.

As illustrated in FIGS. 4-9, electronic device 102 also includes a cover 400 over speaker 314, and a battery compartment 402, for the batteries in main power component 308. There are provisions for connecting or mounting electronic device 102 to the door jam, such as screws 404. Electronic device 102 also includes a button 406 that cooperates with touch input component 312. A volume adjustment wheel 408 cooperates with volume control 320.

Electronic device 102 and electronic device 108 communicate with each other either directly, such as with an ad hoc WiFi connection, or indirectly through network 206. Although not illustrated, electronic device 108 includes a CPU, memory and storage for code, input/output devices, and network access. In some of the implementations described here, an application, or app that is installed on electronic device 108 is used on conjunction with server 110 and electronic device 102. Some of those interactions are illustrated in FIGS. 11-15.

Figure 11:
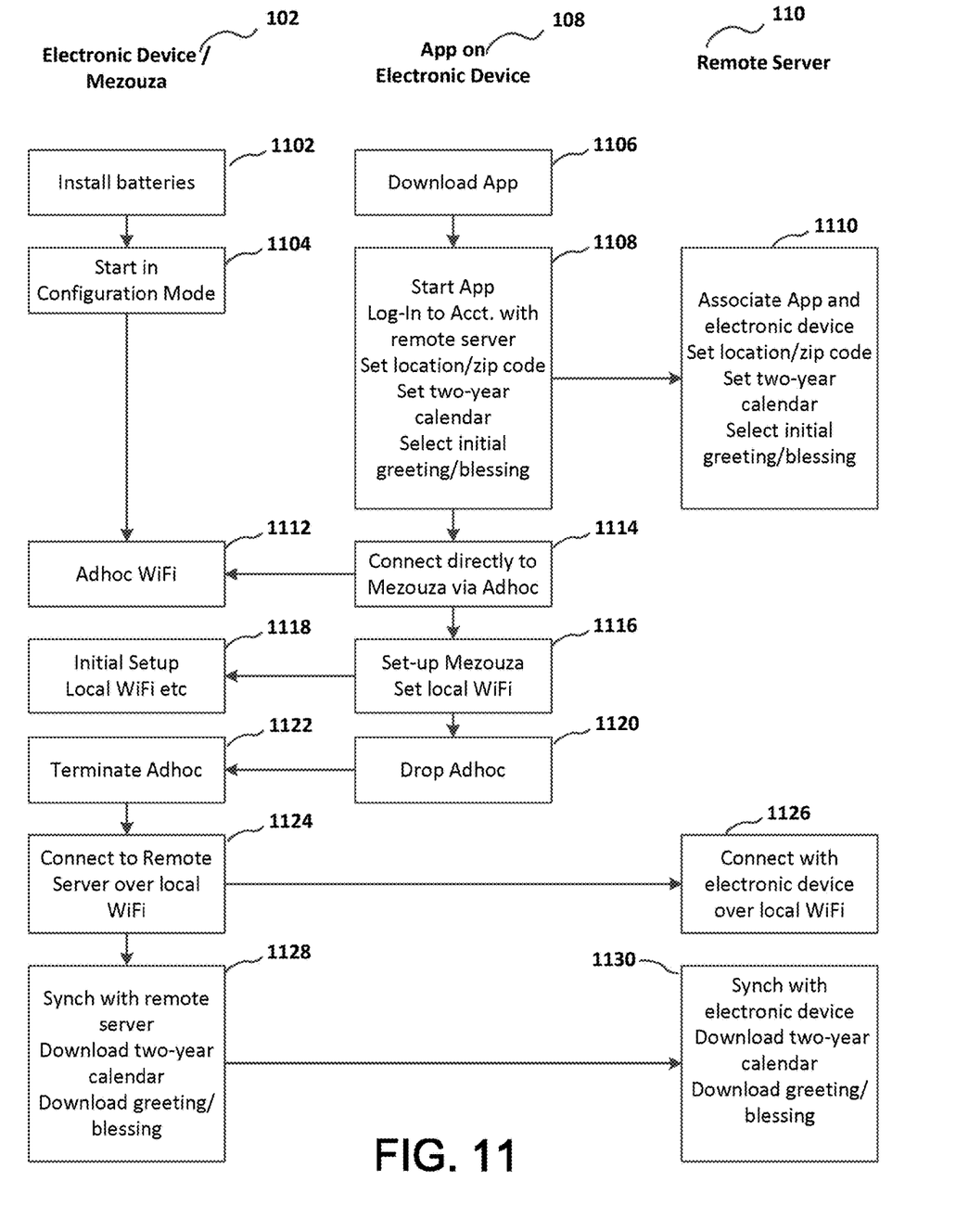
FIG. 11 illustrates steps in an example method for the system according to one embodiment.

FIG. 11 illustrates steps during setup of electronic device 102. Electronic device is typically shipped without any main batteries 308 installed. However, coin battery 310 is generally installed during assembly, and the unit is shipped with coin battery 310 providing power to timing component 316. At 1102, main batteries 308 are installed in battery compartment 402. Installation of main batteries 308 causes electronic device 102 to start in configuration mode (1104).

At 1106, if not already installed on electronic device 108, the application is downloaded (1106) from an application server. Depending on the operating system used by electronic device 108, the application server might be the Apple Store, or the Google Play Store. At 1108, the application is started on electronic device 108, and the application is used to activate an account and sign in to remote server 110. At 1108/1110, the location is set, such as by using a zip code or other location identifier. Using the location, an initial two-year calendar is established, where the two-year calendar includes specific dates and times when it may not be appropriate for electronic device 102 to operate. Examples include holy days and Sabbath days. Also at 1108/1110, an initial greeting/blessing is selected.

At this point in the configuration, electronic device 102 is not wirelessly connected to anything. However, CPU 304 causes wireless communication component 302 to operate in an ad hoc mode (1112), using main battery power 308 that is provided to wireless communication component 302. In ad hoc mode, electronic device broadcasts a WiFi SSID, which electronic device 108 can detect and then connect to using WiFi (1114). This establishes a point-to-point ad hoc wireless connection between electronic device 102 and electronic device 108. This point-to-point ad hoc wireless connection allows electronic device 108 to setup electronic device 102, including providing the SSID of the local WiFi access point 204, and any required password (1116/1118).

Once the initial setup is completed, at 1120, electronic device 108 drops the ad hoc wireless connection at 1120, and electronic device 102 terminates the ad hoc wireless connection 1122.

At 1124/1126, with the point-to-point ad hoc wireless connection terminated, electronic device 102 connects to remote server 110 over the local WiFi using the SSID for access point 204 and any required password that was provided in 1116/1118. With electronic device 102 now connected to remote server 110, the initial synchronization occurs at 1128/1130. This initial synchronization includes downloading the two-year calendar, and the initial greeting/blessing.

Figure 12:
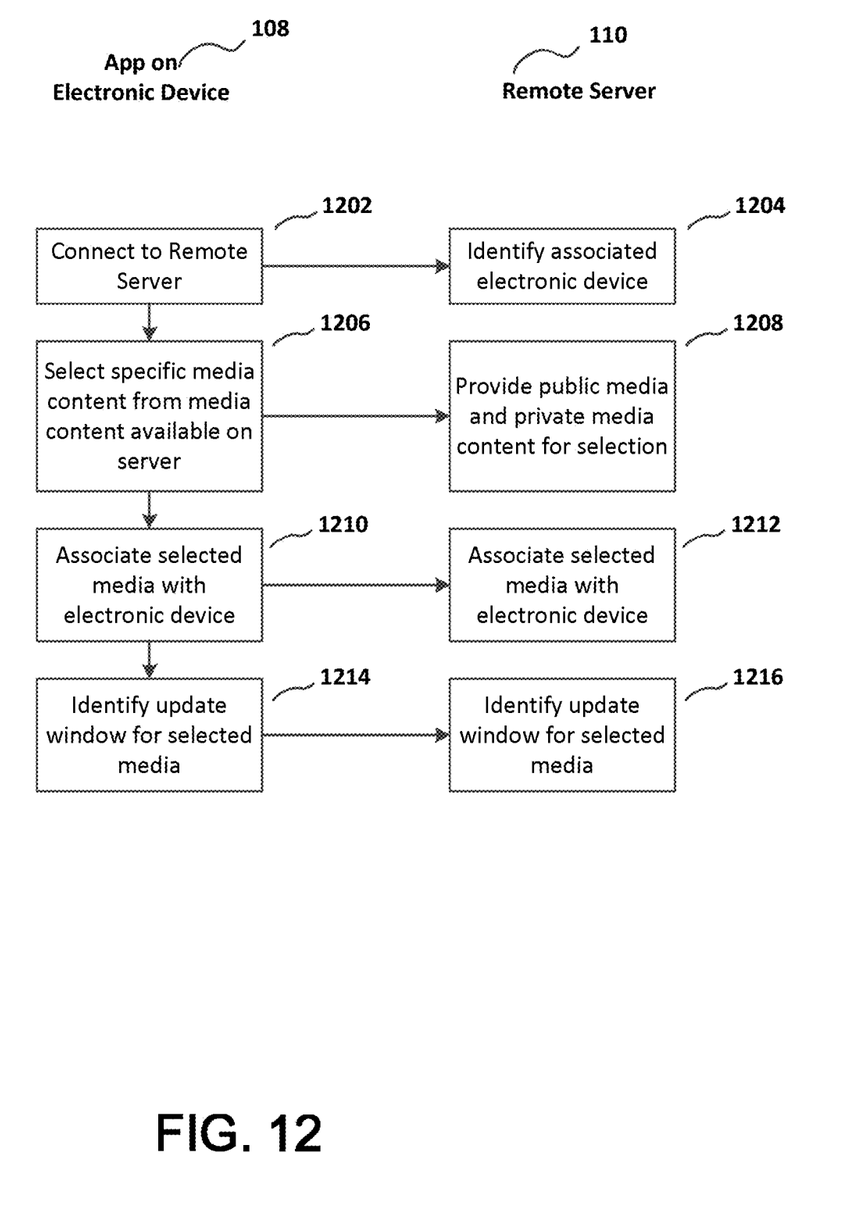
FIG. 12 illustrates steps in an example method for the system according to one embodiment.

After the initial setup, it is possible to change the greeting/blessing that is stored and played by electronic device 102. In one implementation, as illustrated in FIG. 12, the application that is installed on electronic device 108 connects to remote server 110 at 1202/1204. Remote server 110 determines the identity of electronic device 102 from information that is provided by electronic device 108. Using the application, at 1206, a new greeting/message is selected from the content that is available on remote server 110. The media that can be selected on remote server 110 at 1208 includes both public and private media. Public media is available to all users, while private media is restricted to specific user accounts. For example, private media might include blessings recorded by a parent or grandparent in advance of a significant life event for a particular child/grandchild.

At 1210/1212, the selected media is associated with electronic device 102. Where there is only one electronic device 102, this is straightforward. Where there are multiple electronic devices 102, possibly installed at different locations, this ensures that the greeting/message is associated with the intended electronic device 102.

At 1214/1216, an update window is identified for the selected media. In one implementation, the update window might be for the next scheduled update, so that the new greeting/message is loaded to electronic device 102 at the next available opportunity. In another implementation, the update window might be some point in the future that can be identified by a date or event. As an example, the upcoming date for a child's bat mitzvah or bar mitzvah is generally known and relatives of that child might record a greeting/message to celebrate the event well in advance of the date. In this way, if the relative is unable to attend, a greeting from them can be placed in an update window that will upload the bat mitzvah/bar mitzvah greeting to coincide with the future date.

Figure 13:
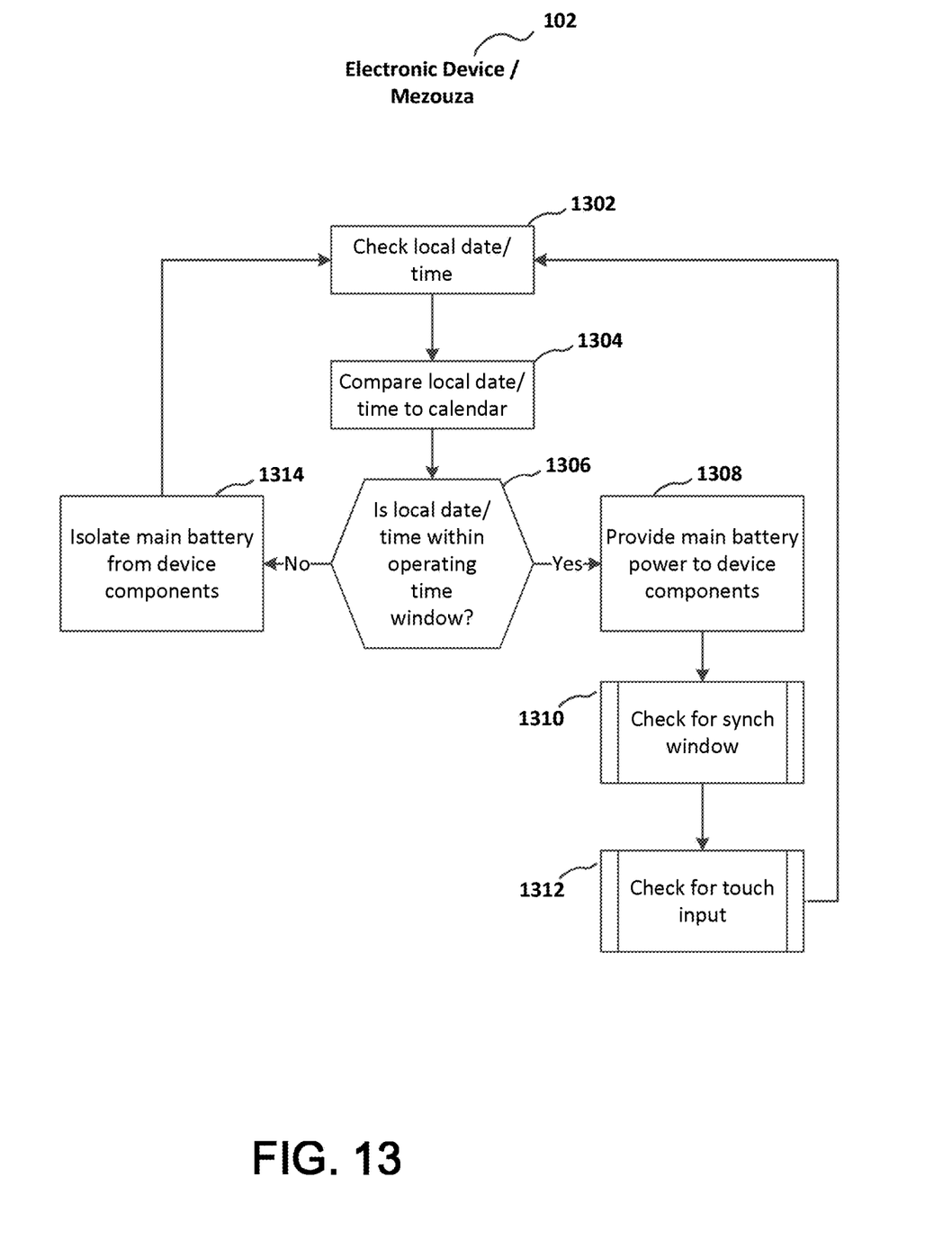
FIG. 13 illustrates steps in an example method for the system according to one embodiment.
Figure 14:
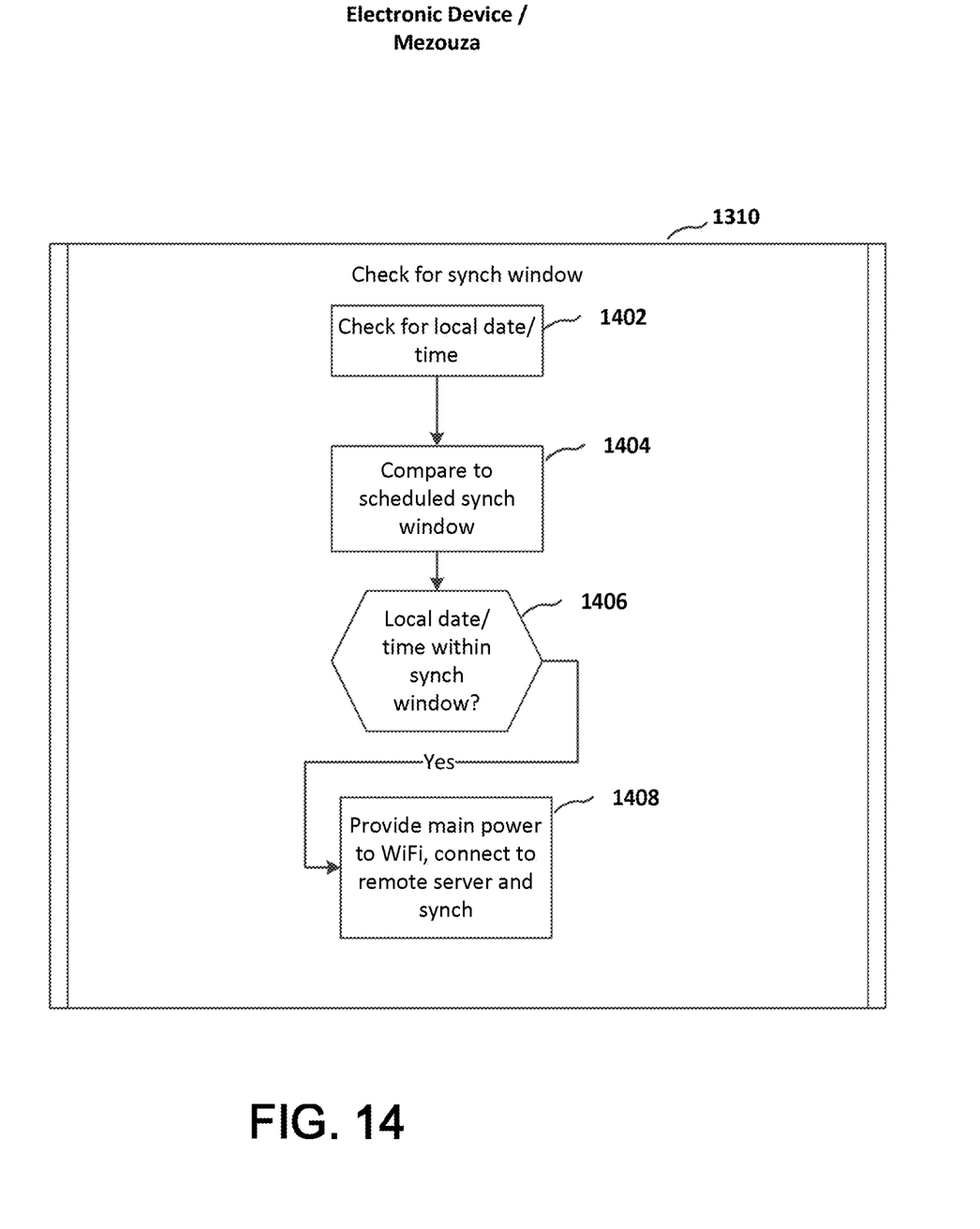
FIG. 14 illustrates steps in an example method for the system according to one embodiment.
Figure 15:
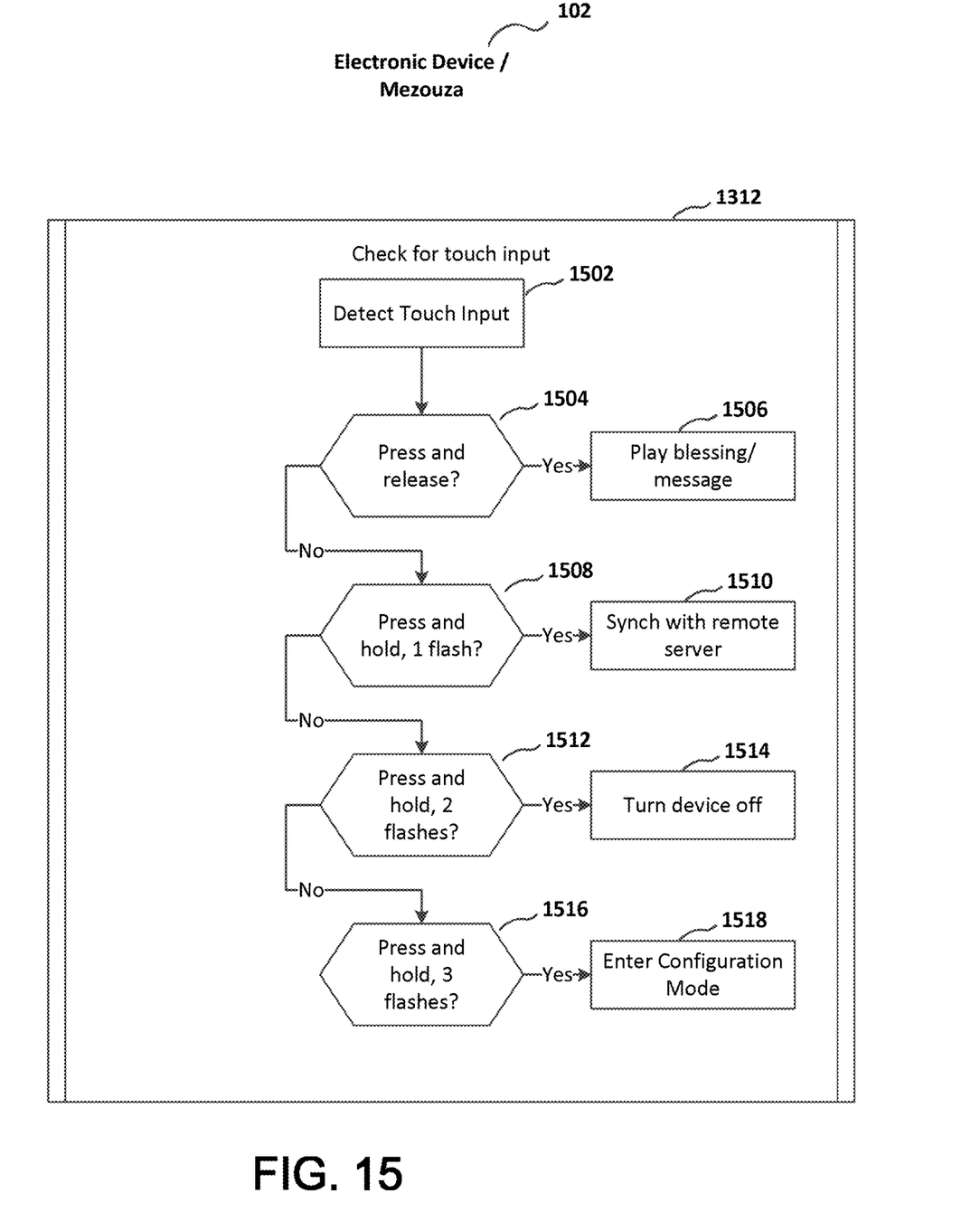
FIG. 15 illustrates steps in an example method for the system according to one embodiment.

In one implementation, electronic device 102 is a mezuzah. It includes a compartment to hold a small scroll that is inscribed with Biblical verses. A mezuzah has a special place in the Jewish faith, it is treated with great respect, and it is important for the mezuzah to be kosher. In order for the electronic device 102 to be kosher, it must not operate during certain high holidays. To accomplish this, there is a timer that disconnects the main electrical power from the device during those high holidays, and then connects the main electrical power to the device when the high holiday is over. FIG. 13 illustrates one implementation. Electronic device 102 includes a coin battery 310, which provides power to timing component 316. At 1302, electronic device 102 gets the local date and time from the timing component 316. At 1304, that local date/time is compared to the two-year calendar that was set up and loaded to electronic device at 1128/1130. The two-year calendar includes the dates and times of high holidays, and other dates/time when electronic device should not operate. If it is determined at 1306 that the local date/time is within an operating time window, then at 1308, power is provided to components of electronic device 102 using main power battery 308. With main battery 308 providing power to components of electronic device 102, at 1310 electronic device checks to determine whether the local date/time is within a synchronization window. Additional steps performed at 1310 are illustrated in FIG. 14. With main battery 308 providing power to components of electronic device 102, at 1312 electronic device checks to determine whether there has been a touch input. Additional steps performed at 1312 are illustrated in FIG. 15.

If it is determined at 1306 that the local date/time is not within an operating time window, then at 1314 power from main battery 308 is isolated from components of electronic device 102. This isolation includes removing power from CPU 304, memory 306 wireless communication component 302, touch input component 312, display component 322, speaker 314 and volume control 320. In this configuration, coin battery power 310 provides power to timing component 316, while all other components of electronic device 102 are isolated from any source of power. In this way, electronic device 102 can be kosher.

As discussed elsewhere, electronic device 102 does not maintain a continuous wireless connection with access point 204, or remote server 110. For that reason, electronic device 102 will not be able to update the greeting/message until there is a connection to remote server 110. These connections can be scheduled to occur on a periodic basis, or they might be when electronic device 102 is placed into that mode.

As illustrated in FIG. 14, when electronic device 102 is programmed to synchronize on a periodic bases, at 1410, electronic device 102 checks the local date/time and at 1404 compares the local date/time to the dates/time of scheduled synchronization windows. If at 1406 it is determined that the local date/time corresponds to the date/time of a scheduled synchronization window, then at 1408, electronic device 102 provides instruction to provide power from main battery power 308 to the wireless communication component 302. This allows electronic device 102 to wirelessly connect to remote server 110 using access point 204, and once connected to remote server 110, electronic device 102 can synchronize content. Synchronizing content includes downloading greetings/messages that were selected for update in 1206 through 1216. In one implementation, electronic device 102 includes memory storage for a single greeting/message, and if a new greeting/message is downloaded, it replaces the greeting/message that is stored in memory of electronic device 102. In other implementations, electronic device 102 includes memory storage for more than one greeting/message. In this way, downloading a new greeting/message during the synchronization does not necessarily replace the old message. Where there is capability for multiple greetings/messages, the selection of which greeting/message should be played can be done through the app, or it can be done on electronic device 102, such as through an input on the touch screen 1002, or through the navigation bar 1004.

Synchronization windows can be selected according to the user preference, but in most cases it is set for regular daily update at a time where interruptions are less likely, such as at midnight.

In a recurring loop while main power is provided to components of electronic device 102 by main power component 308, electronic device 102 checks for touch input (1312). This is illustrated in FIG. 15, and includes detecting a touch input that is detected by touch input component 312 at 1502. A touch input can take numerous forms, such a press and release, or a press and hold. When a press and release is detected at 1504, the blessing/message is played at 1506. When a press and hold is detected, the length of the hold is reflected by the number of flashes on an LED, and that determines the action.

For example, when a press and hold that is long enough to cause one flash is detected at 1508, then at 1510, electronic device 102 enters a synchronization window mode, the same as or similar to the synchronization illustrated at 1408 of FIG. 14. When a press and hold that is long enough to cause two flashes is detected at 1512, electronic device 102 prepares to disconnect all power from the device and shut down at 1514. When a press and longer hold that causes three flashes is detected at 1516, then electronic device 102 enters the configuration mode at 1518. The configuration mode may include steps that are the same as or similar to steps illustrated in 1104, 1112, 1118, 1122, 1124 and 1128 of FIG. 11.

Although electronic device 102 can be almost any size, in one implementation, it is about 1 inch wide, ½ inch deep, and 4 inches long. This size is generally suitable for mounting electronic device 102 on door jam 104.

In the examples provided above, a single electronic device 102 has been described. However, in a home or other environment, it may be desired to install multiple electronic devices 102 at multiple doorways, or passages. Where there are multiple electronic devices 102 installed in a home, the messages or greetings that have been described above, might all be the same. In other implementations, the message or greeting might be different, depending on where the electronic device 102 is installed. For example there might be one message/greeting that is somewhat universal at the main entrance, and different messages/greeting for each bedroom in the home, depending on the person using that bedroom.

Figure 10A:
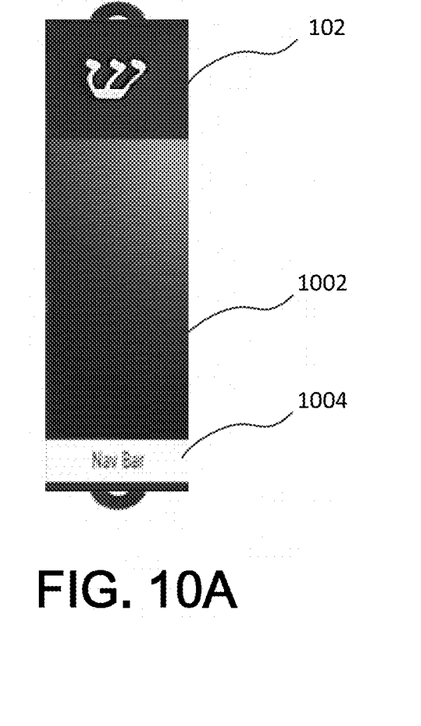
FIGS. 10A, 10B and 10C illustrate examples of an electronic device according to various embodiments.
Figure 10B:
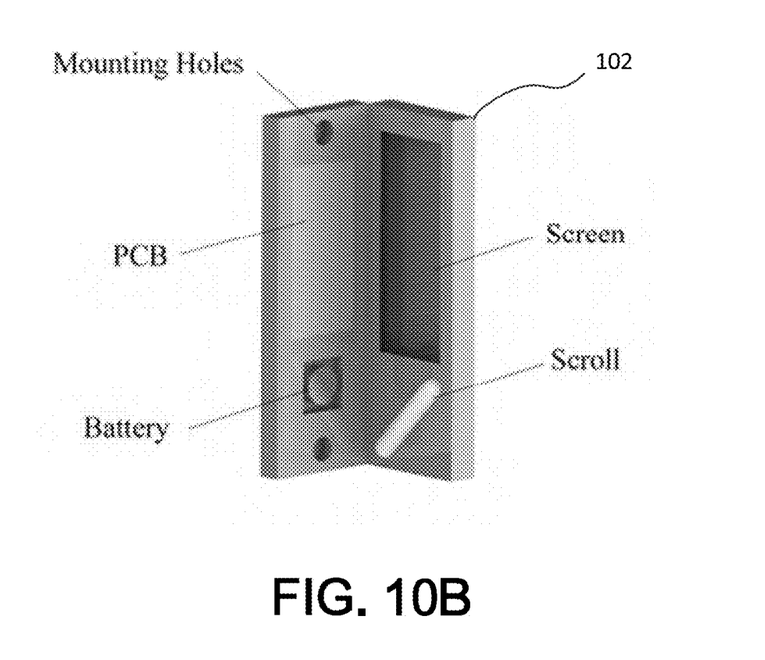
Figure 10C:
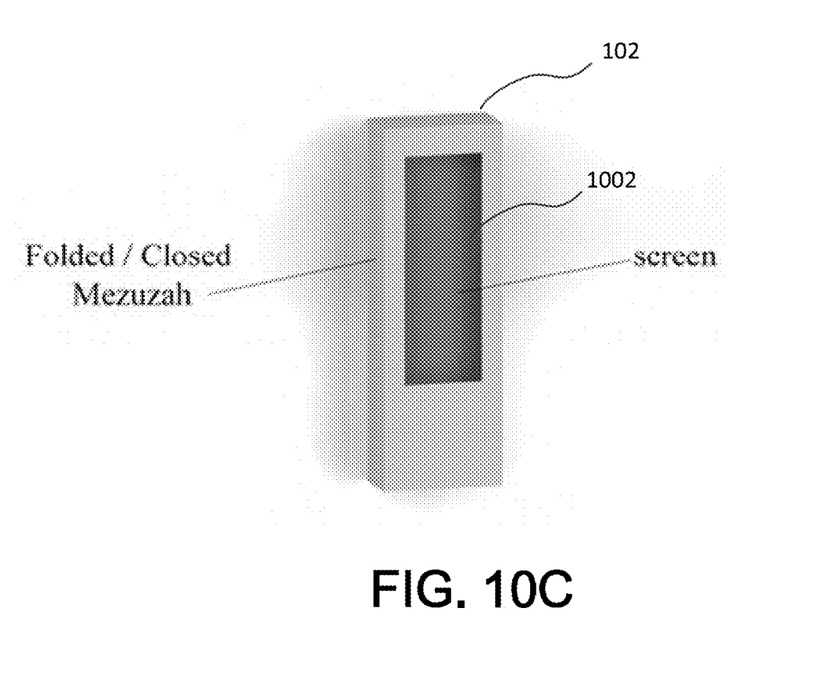

In the implementations described above, electronic device 102 has a touch input 312 for input, and a speaker 314 for audio output. In other implementations that are illustrated in FIGS. 10A, 10B and 10C, electronic device 102 includes a touch screen 1002 for both touch input and video output. The touch screen 1002 may include a touch LCD, E-ink, and other similar technologies. The touch inputs are made on the surface of the touch screen, and the video output is also through the touch screen. The touch screen may also include a navigation bar 1004. During the setup that is illustrated in FIG. 11 and described above, the touch screen of the device illustrated in FIGS. 10A, 10B, and 10C may be used for any inputs to device 102, and the display part of the touch screen may be used for communications with the user.

In the implementations described above, the electronic device has specific use as a mezuzah. However, details and features of the device are also appropriate for other faiths or traditions where playing a blessing or message in response to a touch input is appropriate. As such, the invention is not limited to a mezuzah in the Jewish faith.

In addition, the device has been illustrated and described as affixed to a door frame. The device can also be attached to a small chain and used as jewelry. The device can be exposed or placed in any public or private place.

Although illustrative embodiments have been described herein in detail, it should be noted and will be appreciated by those skilled in the art that numerous variations may be made within the scope of this invention without departing from the principle of this invention and without sacrificing its chief advantages. For example features that appear in one embodiment of a particular figure are also applicable to embodiments that are illustrated in other figures.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. An electronic device, comprising:
   at least one processor;
   an input component to electrically communicate with the at least one processor;
   a timing component to electrically communicate with the at least one processor;
   a first battery having a first storage capacity to provide first electric power to first components of the electronic device, the first components to receive the first electric power exclusively from the first battery;
   a second battery having a second storage capacity to provide second electric power to the timing component, the timing component to receive the second electric power exclusively from the second battery, the first battery different from and electrically separate from the second battery;
   a wireless communication component to electrically communicate with the at least one processor;
   a media presentation component to electrically communicate with the at least one processor;
   a physical mounting component to mount the electronic device at a passageway; and
   memory including instructions that, when executed by the at least one processor, cause the electronic device to:
   determine a first local time using at least the timing component;
   determine that the first local time is within either an operating time period, or a non-operating time period by comparing the first local time to first data stored in a database, the first data including at least dates and times of Jewish high holidays corresponding to the non-operating time period when electronic devices should not be operated;
   based at least on the first local time being within the operating time period, providing the first electric power to the first components of the electronic device using the first battery;
   based at least on the first local time being within the non-operating time period, isolating the first electric power from the first components of the electronic device;
   wherein in response to said determine that the first local time is within the operating time period, the memory further including instructions that when executed by the at least one processor, cause the electronic device to:
   determine a second local time corresponding to at least one of scheduled synchronization windows;
   providing the first electric power to the wireless communication component to connect the electronic device to a remote server in response to the second local time corresponding to the at least one of scheduled synchronization windows;
   download a selected message during the at least one of the scheduled synchronization windows; and
   present media content corresponding to the selected message via the media presentation component in response to determine of an input using the input component.

2. The electronic device according to claim 1, further comprising a compartment configured to store a rolled piece of parchment with an inscribed message.

3. The electronic device according to claim 1, wherein the wireless communication component is one of a WiFi component, or a Bluetooth component.

4. The electronic device according to claim 1, wherein the input component is one of a switch, a button, or a touch sensor.

5. The electronic device according to claim 1, wherein the media content is one of audio media or video media.

6. The electronic device according to claim 1, wherein the first storage capacity of the first battery is greater than the second storage capacity of the second battery.

7. The electronic device according to claim 1, further comprising:
   a display component electrically communicate with the at least one processor to display of video, the memory, further including instructions that, when executed by the at least one processor, cause the electronic device to: present video media content on the display component, in response to the input.

8. An electronic device, comprising:
   a first battery having first storage capacity and providing first electric power to first components of the electronic device, the first components receiving the first electric power exclusively from the first battery;
   at least one processor electrically connected to and receiving the first electric power from the first battery, the at least one processor being one of the first components;
   a button, electrically connected to the at least one processor;
   a speaker, electrically connected to the at least one processor;
   a WiFi component electrically connected to the at least one processor, receiving the first electric power from the first battery and electrically communicating with the at least one processor, the component being one of the first components;
   a timing component electrically communicating with the at least one processor;
   a second battery having second storage capacity and providing second electric power to the timing component, the timing component receiving, the second electric power exclusively from the second battery, the first battery different from the second battery, the first storage capacity of the first battery greater than the second storage capacity of the second battery;

a physical mounting component to mount the electronic device at a passageway;

a compartment to store a rolled piece of parchment with an inscribed message; and memory including instructions that, when executed by the at least one processor, cause the electronic device to:

determine a first local time using at least the timing component;

determine that the first local time is within either an operating time period, or a non-operating time period by comparing the first local time to first data stored in a database, the first data including at least dates and times of Jewish high holidays corresponding to the non-operating, time period when electronic devices should not be operated;

in response to the first local time being within the operating time period:

providing the first electric power from the first battery to the first components of the electronic device;

receiving an input, using the button;

in response to receiving the input, present first audio content using the speaker, the first audio content stored in storage that is local to the electronic device;

determine a second local time corresponding to at least one of scheduled synchronization windows;

provide the first electric power to the Wifi component to establish, based on the second local time, a connection between the electronic device and a remote server using the WiFi component in response to the second local time corresponding to the at least one of scheduled synchronization windows;

determine that second audio content is available on the remote server:

download a local copy of the second audio content in the storage that is local to the electronic device; and in response to the first local time being within the non-operating time period, isolating the first battery from the first components of the electronic device.

9. A method for use with an electronic device that is physically mounted at a passage and has a compartment for storing a rolled piece of parchment with an inscribed message, the method comprising:

providing second electric power to a timing component of the electronic device from a second battery having second storage capacity, the timing component receiving the second electric power exclusively from the second battery;

determining a first local time using the timing component;

determining that the first local time is within either an operating time period, or a non-operating time period by comparing the first local time to first data stored in a database, the first data including at least dates and times of Jewish high holidays corresponding to the non-operating time period when electronic devices should not be operated;

in response to the first local time being within the operating time period:

providing first electric power to first components of the electronic device from a first battery having first storage capacity, the first components receiving the first electric power exclusively from the first battery, the first storage capacity greater than the second storage capacity, the first components including at least a WiFi component;

receiving an input, using a button of the electronic device;

in response to receiving the input, presenting first audio content using a speaker of the electronic device, the first audio content stored in a storage that is local to the electronic device;

determining a second local time corresponding to at least one of scheduled synchronization windows;

providing the first electric power to the Wifi component to establish, based on the second local time, a connection between the electronic device and a remote server using the WiFi component in response to the second local time corresponding to the at least one of scheduled synchronization windows;

determining that second audio content is available on the remote server;

downloading a local copy of the second audio content in the storage that is local to the electronic device; and in response to the first local time being within the non-operating time period, isolating the first battery from the first components of the electronic device.

* * * * *